United States Patent [19]

Takahashi et al.

[11] Patent Number: 5,531,552
[45] Date of Patent: Jul. 2, 1996

[54] SELF-ATTACHING NUT AND METHOD OF MAKING SAME

[75] Inventors: Takao Takahashi, Machida; Hiroshi Takehara, Hachioji, both of Japan

[73] Assignee: Multifastener Corporation, Detroit, Mich.

[21] Appl. No.: 293,800

[22] Filed: Aug. 22, 1994

Related U.S. Application Data

[63] Continuation-in-part of Ser. No. 11,439, Jan. 29, 1993, Pat. No. 5,340,251, and a continuation-in-part of Ser. No. 285,201, Aug. 3, 1984.

[30] Foreign Application Priority Data

Feb. 25, 1994 [JP] Japan .................... 6-215115

[51] Int. Cl.⁶ .................... F16B 37/04; B23P 11/00
[52] U.S. Cl. .................... 411/179; 411/180; 29/432.2
[58] Field of Search .................... 411/177, 179, 411/180, 181, 183; 29/432.2, 525.1

[56] References Cited

U.S. PATENT DOCUMENTS

| | | | |
|---|---|---|---|
| 3,648,747 | 3/1972 | Steward | 411/179 |
| 3,810,291 | 5/1974 | Ladouceur | 411/179 X |
| 3,878,599 | 4/1975 | Ladouceur et al. | 411/179 X |
| 4,708,556 | 11/1987 | Pamer et al. | 411/179 |

*Primary Examiner*—Neill R. Wilson
*Attorney, Agent, or Firm*—Howard & Howard

[57] ABSTRACT

A method of making a self-attaching nut or pierce nut, such as a round nut having cylindrical pilot, an annular groove surrounding the pilot and a panel supporting flange portion surrounding the groove, wherein the groove bottom wall includes a plurality of circumferentially spaced anti-rotation protuberances separated by radial channels and wherein the flange portion is preferably tapered toward the pilot portion to provide a re-entrant groove which provides a secure installation to a panel. The method includes first forming a nut blank having the general configuration of the nut with a continuous annular protuberance and an annular flange portion which extends perpendicular to the groove bottom wall. A forming punch having a cylindrical axial bore and a plurality of generally rectangular or trapezoidal circumferentially spaced projections on the punch forming end is then driven into the groove to telescopically receive the pilot portion and driven against the continuous annular protuberance to form a plurality of circumferentially spaced protuberances which extend from the pilot portion to a midportion of the groove bottom wall. In the most preferred embodiment, the projections on the punch are spaced from the bore, such that semi-circular bridging portions are formed integral with the pilot portion and adjacent protuberances.

13 Claims, 3 Drawing Sheets

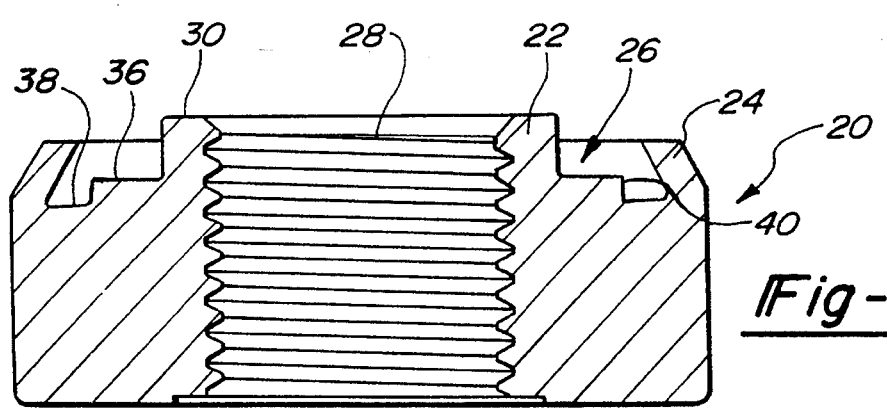
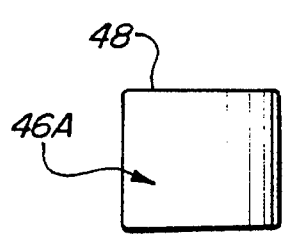
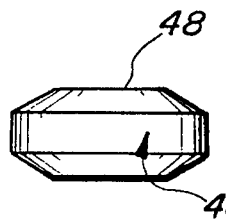
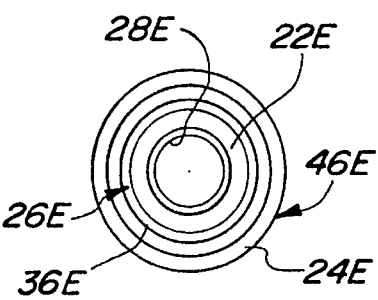
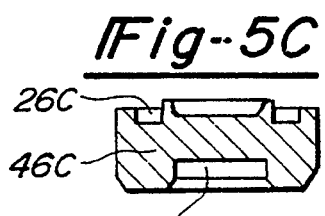
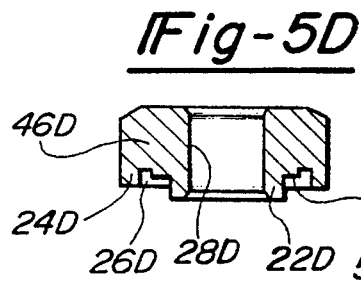
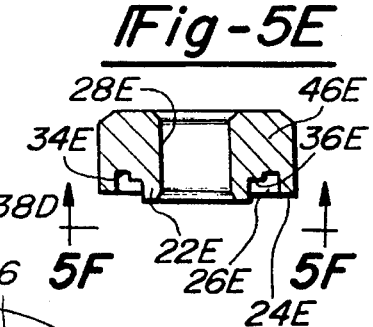
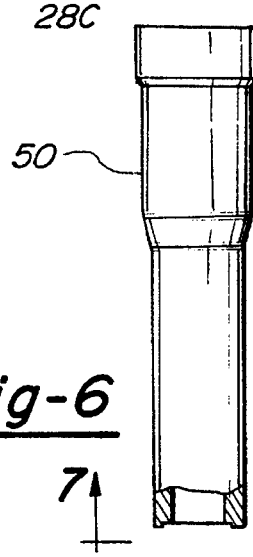
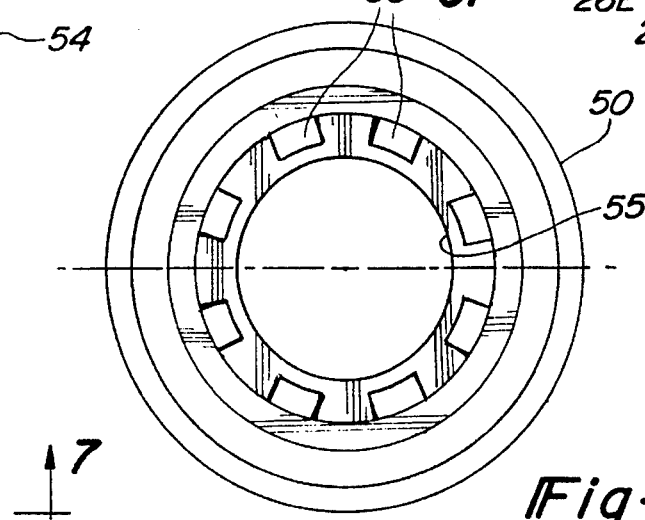

SELF-ATTACHING NUT AND METHOD OF MAKING SAME

RELATED APPLICATIONS

This application is a continuation-in-part application of U.S. patent application Ser. No. 08/011,439, filed Jan. 29, 1993, (which claims priority to two Japanese applications 1992-45997 and 1992-45998, both filed Jan. 31, 1992), now U.S. Pat. No. 5,340,251, and a continuation-in-part application of Ser. No. 08/285,201, filed Aug. 3, 1994, which claims priority to Japanese patent application 6(1994)-051022, filed Feb. 25, 1994.

This invention relates to self-attaching nuts, including pierce nuts, which may be attached to a metal panel or plate in a single stroke of a press, and method of forming such fasteners with increased tool life.

BACKGROUND OF THE INVENTION

Self-clinching nuts and pierce nuts of the type disclosed herein generally include a projecting central pilot portion, which may be used to pierce a metal panel or plate to which the fastener is attached and the pilot portion is then received through the pierced panel opening. The nut is then attached to the metal plate by a die member or "die button" which forms a mechanical interlock between the nut and the panel. The panel may be deformed by the die member into grooves in the nut or the nut may be deformed to entrap panel metal.

Many pierce nuts are used by the automotive industry to assemble cars in which many components of various kinds are attached to metal plates or panels. For example, piece nuts are used to attach lamps and sheet metal parts to the vehicle. When such parts are attached, screws or bolts are threaded into the hole or bore in the nut and a bolt or screw is tightened with a rotating tool, such as a torque wrench, at prescribed torque values. When the nut is used as a clinch nut, the nut may be attached to a preformed panel opening and the nut bore may be unthreaded to receive a thread forming or thread rolling bolt. The pierce or clinch nut must therefore have sufficient anti-torque or rotation resistance (the force that keeps the nut from rotating on the metal plate when a bolt is threaded into the nut bore and tightened) to bind the nut to the metal panel. After a component is attached to the nut on a metal plate, external forces, such a vibration and tensile forces, applied to the vehicle, act upon the nuts from the pull-through direction attempting to pull the nuts from the metal plate to which they are attached. Therefore, each pierce or clinch nut must have sufficient pull-through resistance (the force that keeps the nut from coming out of the panel when the nut and a bolt are engaged and the force is applied to the bolt perpendicular to the metal plate) that is stronger than these external surfaces.

As stated, the torque of the rotation tool or torque wrench is generally predetermined, such that the rotational resistance of the pierce or clinch nut in the panel should be sufficient to resist this torque value, but the external forces applied to the vehicle cannot be forecast. Therefore, the aforementioned pull-through resistance must be relatively high. When pierce or clinch nuts are being driven into metal plates, the nuts are supplied to the installation tooling continuously through an outlet of a supply device, such as a hopper or cartridge. Thus, it would be preferred if the shape of the pierce or clinch nuts permit free variance of the attachment orientation on the surface of the metal plate. In other words, the shape of the pierce or clinch nut should preferably permit free variation of the rotational orientation that each nut emerges from the outlet of the hopper or cartridge. In cases where pierce nuts are driven into a metal panel in a number of locations, the pierce nuts should be shaped so that the direction of the pierce nut outlet can be freely varied to suit the installation operation.

Further, in the automotive industry, for example, which utilizes many pierce nuts, there is a trend toward thinner metal panels or plates to reduce the weight of each vehicle. Thus, it is necessary to have pierce or clinch nuts shaped to provide the necessary rotation resistance and greater pull-out and pull-through resistance, even when used on thin metal plates. When, for example, it is necessary to achieve pull-out resistance in excess of 200 kg and sufficient rotation resistance to withstand the tightening torque when applied by a torque wrench with a 0.6 min. plate and the bolt or screw meets resistance during engagement of the nut, existing pierce nuts of the type described above often cannot consistently satisfy these requirements.

As described, a pierce or clinch nut is typically attached to a metal panel or plate with an installation die or die button. The die button includes one or more projecting lips configured to be received in the nut groove or grooves. When the pierce or clinch nut has an annular groove as described herein, the die button includes an annular lip configured to be received in the annular groove of the nut. When the self-attaching nut is a pierce nut, the die button typically includes a shearing edge or surface which cooperates with an outside surface of the pilot portion of the pierce nut to pierce an opening in the panel and the die button then deforms the panel into interlocking relation with the nut groove or grooves. This mechanical interlock must be sufficient to withstand the various forces described. The improved self-clinching or pierce nut described in the above-identified related applications having a protrusion in the groove bottom wall provide improved torque resistance and mechanical interlock between the nut and the panel while improving die button life.

Certain problems, however, developed in the manufacture of the embodiments of the self-attaching nut disclosed in the above-identified related applications. As will be understood by those skilled in the art, the forming punch used to form the annular groove of the self-attaching nut generally conforms to the shape of the groove bottom wall, including the protuberances described. The nut is generally formed from a metal blank, preferably a drawn metal rod of cold heading quality steel. The rod is cut to length and partially formed in a conventional cold-heading operation to form the general configuration of the nut, including the pilot portion, flange portion and an annular groove. However, when a conventional cold heading tool or punch was utilized to form the preferred configuration of the bottom of the groove, including the spaced protuberances, it was found that the tool life was insufficient for mass production applications. Thus, it was necessary to modify the method of making the self-attaching nut to improve tool life and certain modifications were also made to the nut configuration to utilize the improved method of this invention.

SUMMARY OF THE INVENTION

As described, the method of making a self-attaching nut of this invention may be utilized to make self-clinching nuts and pierce nuts of the general type which include a central projecting pilot portion having a generally cylindrical axial bore, an annular panel supporting flange portion generally surrounding the pilot portion and an annular groove in the flange portion surrounding the pilot portion having opposed inner and outer side walls and a bottom wall. The method of this invention includes first forming a nut blank which includes a central pilot portion, an annular flange portion and an annular groove in the flange portion surrounding the pilot portion. In the preferred embodiments, the outer surface of the pilot portion defines the inner wall of the groove and the bottom wall of the groove in the nut blank includes a continuous annular protrusion which encircles the groove inner wall, preferably spaced from the groove outer wall.

The method of this invention then includes driving a punch against the annular protrusion to form a plurality of circumferentially spaced protrusions having radial channels between the protrusions. The punch preferably includes a central axial bore which telescopically receives the pilot portion of the nut blank during forming of the protrusion and a plurality of projections spaced circumferentially around the bore of the punch. The method then includes driving the punch projections into the continuous annular protrusion in the groove bottom wall which form the radial channels between the protrusions described above. In a most preferred embodiment, the projections on the forming end of the punch are spaced radially from the bore of the punch, such that the channels are formed spaced radially from the pilot portion and the nut includes annular bridging portions integral with the groove inner wall and the adjacent protuberances.

In the preferred method of this invention, the outer wall of the groove of the nut blank is generally perpendicular to the bottom wall of the groove and the method includes a further step of forming a re-entrant groove having an inclined outer side wall, which substantially improves the mechanical interlock between the nut and the panel to which it is attached. As described above and more fully in the above-identified co-pending applications, the self-attaching nut of this invention is installed in a panel with a die button having a projecting lip which deforms the panel into the nut groove against the circumferentially spaced protuberances and into the radial channels between the protuberances and between the protuberances and the inclined outer side wall. The protuberances control the deformation and flow of the metal panel, as described. However, the flange portion preferably extends generally perpendicular to the bottom wall of the nut blank to provide for receipt of projections on the forming punch having relatively robust projections; that is, the projections of the punch preferably have a wide radial width to reduce breakage of the projections during forming of the nut. Where the nut blank has an inclined outer side wall, the projections must be thin enough to be received through the restricted opening to the groove, which results in breakage of the projections. Thus, the re-entrant nut groove is preferably formed in a later step of the method of this invention, after formation of the circumferentially spaced protuberances and channels, as described above.

In the preferred method of this invention, the re-entrant groove is formed by a separate forming die or punch including a central axial opening, configured to receive the flange portion of the nut, having a chamfered surface inclined from adjacent the end portion of the punch toward the axis of the bore. The method then includes driving the chamfered surface of the punch against the outer surface of the flange portion, which deforms the end of the flange portion spaced from the bottom wall of the groove radially inwardly, forming an inclined inner surface on the outer wall of the groove and defining the preferred re-entrant groove described above.

As described, the preferred configuration of the self-attaching nut of this invention is circular, including a generally cylindrical outer surface, except as deformed by the final forming punch described above. This permits free orientation of the nut during installation as described above. Further, the outer surface of the pilot, which defines the inner surface of the nut groove, is also preferably cylindrical to accommodate a forming punch which forms the final configuration of the bottom wall of the groove having a radial width which is as wide as possible, further improving the tool life of the groove forming punch. However, the self-attaching nut of this invention may also be polygonal, such as an eight sided nut, which further improves the torque resistance of the nut. For purposes of description, the self-attaching nut of this invention will be described as annular, which includes polygonal configurations.

Thus, the improved method of making a self-attaching nut fastener of this invention improves the tool life of the tools utilized to make the preferred embodiment of the self-attaching nut, resulting in an improved self-attaching nut suitable for mass production applications. Other advantages and meritorious features of this invention will be more fully understood from the following description of the preferred embodiments, the appended claims and the drawings, a brief description of which follows.

BRIEF DESCRIPTION OF THE DRAWINGS

FIG. 4 is a cross-sectional side view of the self-attaching nut shown in FIG. 2 in the direction of view-arrows 4—4;

FIG. 5A is a side view of a typical wire section, which is the first stage of the nut blank;

FIG. 5B is a side view of the nut blank following initial forming;

FIG. 5C is a cross-sectional side view of the nut blank following further forming;

FIG. 5D is a cross-section of the nut blank following further forming;

FIG. 5E is a side cross-sectional view of the nut blank following further forming;

FIG. 5F is a top view of the nut blank shown in FIG. 5E;

FIG. 6 is a partially cross-section side view of one embodiment of a forming or cold-working punch, which may be used to form the final configuration of the nut groove;

FIG. 7 is an end view of the punch shown in FIG. 6 in the direction of view-arrows 7—7;

DESCRIPTION OF THE PREFERRED EMBODIMENTS AND METHOD OF THIS INVENTION

Figure 1:
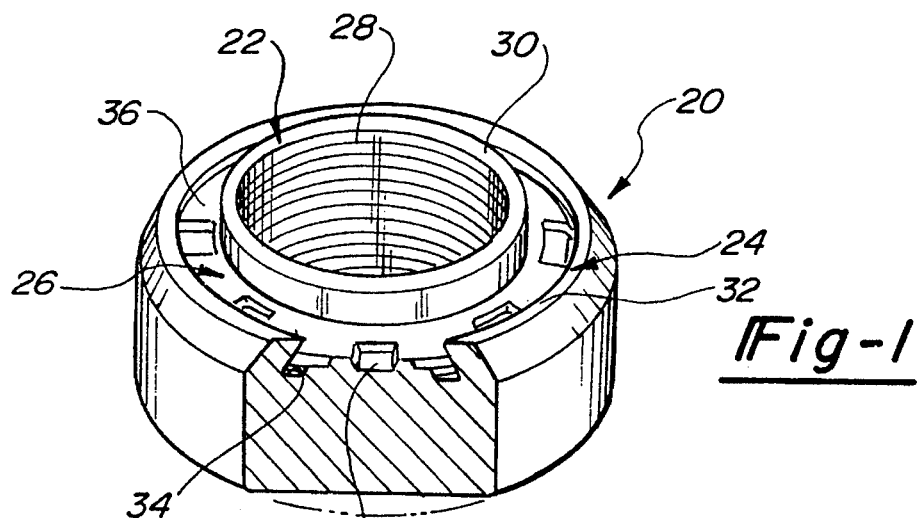
FIG. 1 is a top partially cross-sectioned perspective view of an improved embodiment of the self-attaching nut made by the method of this invention.
Figure 2:
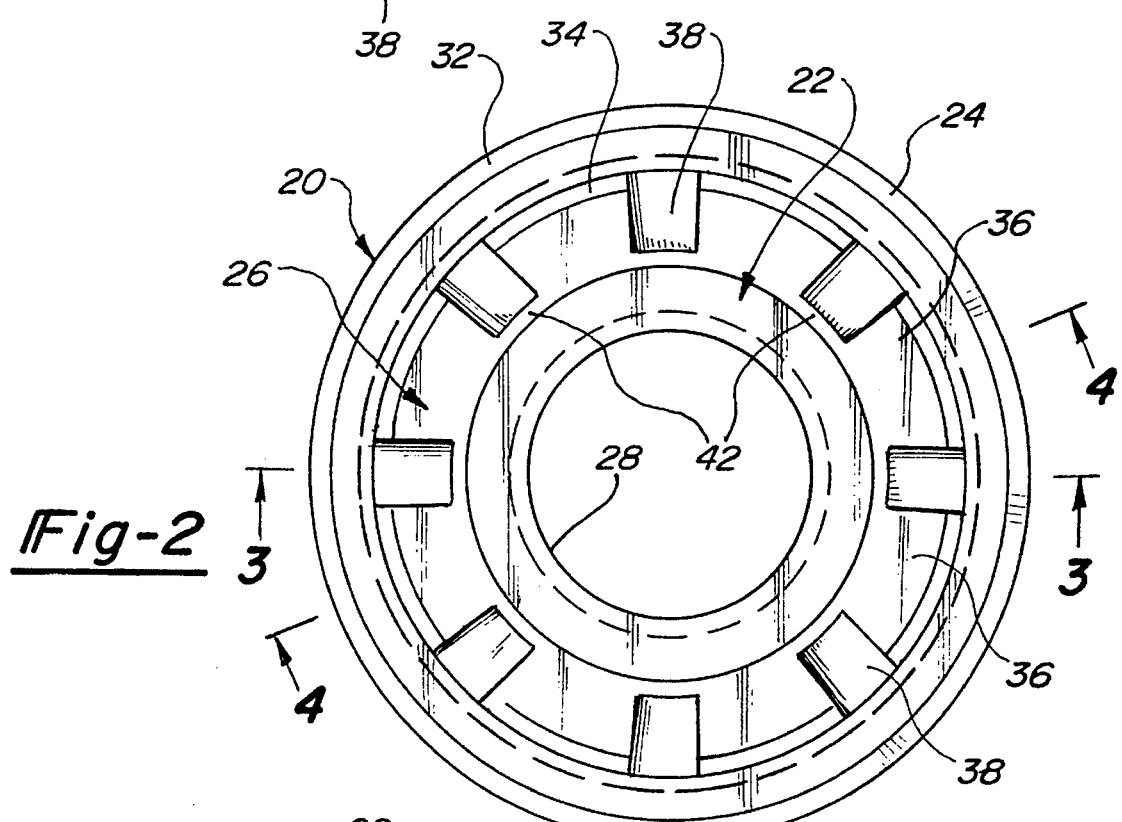
FIG. 2 is a top plan view of the self-attaching nut shown in FIG. 1.
Figure 3:
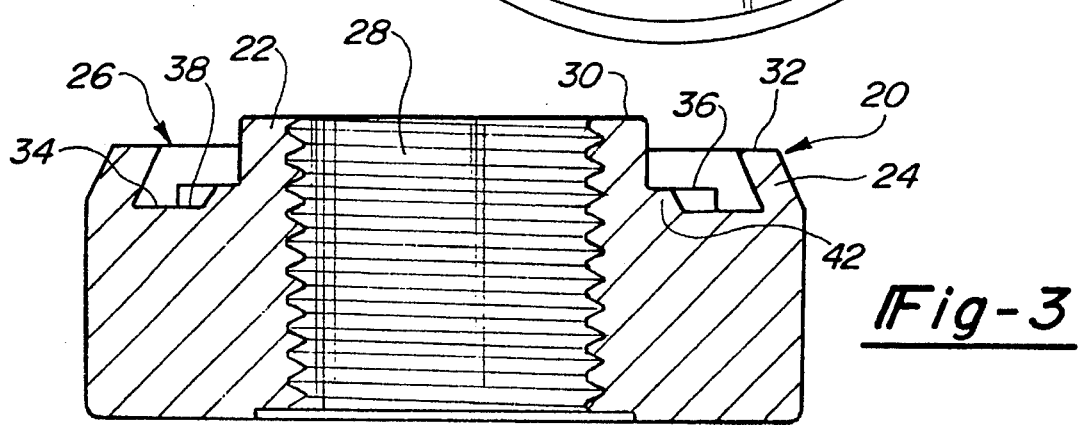
FIG. 3 is a cross-sectional side view of the self-attaching nut shown in FIG. 2 in the direction of view-arrows 3—3.

The improved self-attaching nut 20 of this invention is best shown in FIGS. 1 to 4, wherein the nut includes a central annular pilot portion 22, an annular flange portion 24 which surrounds the pilot portion 22 and an annular groove 26 in the flange portion which surrounds the pilot portion. As shown, the nut 20 includes an internally threaded axial bore 28; however, as described above, the bore 28 may also be unthreaded or cylindrical to receive a self-tapping or thread rolling screw or bolt. Where the self-attaching nut is used as a pierce nut, the free-end 30 of the pilot portion 22 is preferably spaced above the plane of the flange portion 24, as best shown in FIGS. 3 and 4. During installation of the pierce nut, the pilot portion 22 in cooperation with a die button (not shown) pierces a hole in the metal panel (not shown) as described in the above-identified co-pending applications. The panel is then received on the panel supporting surface 32 of the flange portion 24 and the panel is deformed by the die button into the nut groove 26. In the preferred embodiments of the self-attaching nut 20, the flange portion 24 is inclined inwardly toward the pilot portion 22 to define a restricted opening to the groove 26, which is referred to as a re-entrant groove. As the panel metal is deformed into the groove 26 by the die button (not shown) the panel metal is deformed beneath the inner surface of the inclined flange portion, forming a very secure mechanical interlock between the panel and the self-attaching nut 20.

In the preferred embodiment of the self-attaching nut 20, the bottom wall 34 of the groove 26 includes a plurality of circumferentially spaced protuberances 36 separated by radial channels 38. In the most preferred embodiment of the self-attaching nut, the protuberances 38 are integral with the pilot portion 22 and extend radially to a midportion of the groove bottom wall 34, spaced from the inclined outer wall of the groove, which is defined by flange portion 24. The radial outer surfaces 40 of the protuberances 36 may be perpendicular to the bottom wall 34, as shown in FIG. 4, inclined radially outwardly or arcuate as shown in the above-identified co-pending applications to direct panel metal against the bottom wall 36 and beneath the inclined outer wall 24. The bottom wall 34 of the groove further includes semicircular bridging portions 42, which are integral with the pilot portion and the adjacent protuberances 36, as best shown in FIGS. 2 and 3. These bridging portions 42 further strengthen the pilot portion 22 during installation of the nut as a pierce nut, wherein the pilot pierces an opening in the panel (not shown). Thus, the bridging portions 42 would not be required where the self-attaching nut 20 is used as a clinch nut, wherein the pilot 22 may be of the same height of the flange portion 24. The bridging portions 42 further confine the channels 38, forming contained pockets as shown in FIG. 2, which improves the torque resistance of the nut when installed in a panel.

As described above, problems developed with forming the self-attaching nut described in the above-referenced co-pending applications. More specifically, the tool life was not sufficient for mass production applications wherein the configuration of the bottom wall of the groove, including the circumferentially spaced protuberances, was formed with a single die or machined in the bottom wall of the groove. The method of this invention substantially improves tool life, without sacrificing the benefits of the self-attaching nut 20 of this invention. FIGS. 5A to 5F illustrate the initial forming steps of the nut blank. FIG. 5A illustrates the first stage of the nut blank 46A, which in the disclosed embodiment is a cylindrical wire of cold heading quality steel, such as SAE 1010 or 1015 CHQ. The wire has been cut to length, such that the metal volume is equal to the volume of the finished self-attaching nut, except for the metal pierced out of the axial bore 28. As will be understood by those skilled in the art, the ends 48 of the cut wire are not completely flat and therefore the nut blank ends 48 are first reformed to form the nut blank 46B shown in FIG. 5B. The nut bore 28C and the annular nut groove 26C is then partially formed in the nut blank 46C, as shown in FIG. 5C. The nut bore 28D is then pierced through the nut and the pilot portion 22D. The bottom wall of the groove 26D is simultaneously reformed to form a continuous annular protuberance 36D. As described more fully in the above-referenced co-pending application filed Aug. 3, 1994, the protuberance 36D is preferably formed integral with the pilot portion 22D to substantially reduce breakage of the punch which forms the groove bottom wall as shown in FIG. 5D. Where the protuberance was spaced from the inner and outer walls of the groove, the forming punch included a pocket or pockets which entrapped oil and other debris, causing breakage of the punch. Forming the protuberance 36D integral with the pilot eliminated the pockets, thus substantially reducing punch breakage. As will be understood by those skilled in the art, the forming end of the punch which forms the bottom wall of the groove as shown in FIG. 5D does not include pockets and thus forming oils are permitted to easily escape from the groove during formation of the groove bottom wall. The nut blank 46D is then qualified and finally sized as shown in FIGS. 5E and 5F.

As shown in FIGS. 5E and 5F, the nut blank 46E includes a central annular pilot portion 22E, an annular flange portion 24E and an annular groove 26E in the flange portion which encircles the pilot portion 22E. The bottom wall 34E includes an annular protuberance 36E integral with the pilot portion 22E which extends radially to a midportion of the groove bottom wall. As used herein, "midportion" defines a location between the pilot portion and the groove outer wall, spaced from the groove outwall to receive panel metal. The nut bore 28E is unthreaded, but may be threaded as a final operation, as described above. The protuberance 36E is then reformed with the forming punch or cold heading tool 50 shown in FIGS. 6 to 8.

Figure 8:
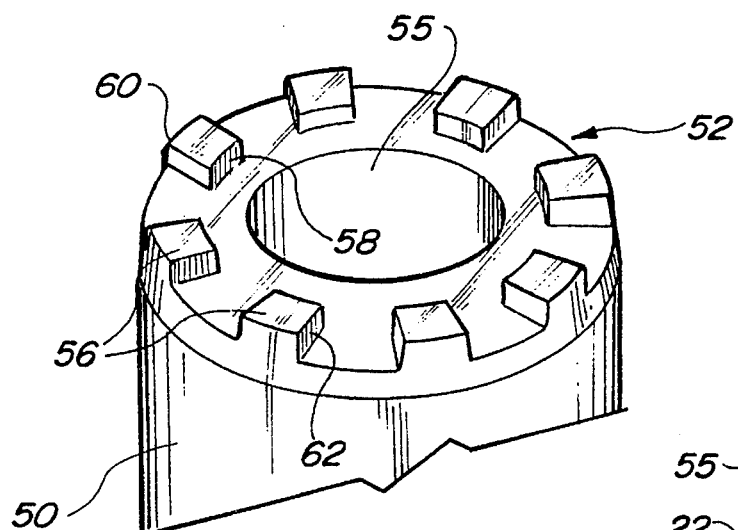
FIG. 8 is an end perspective view of the punch shown in FIGS. 6 and 7.
Figure 9:
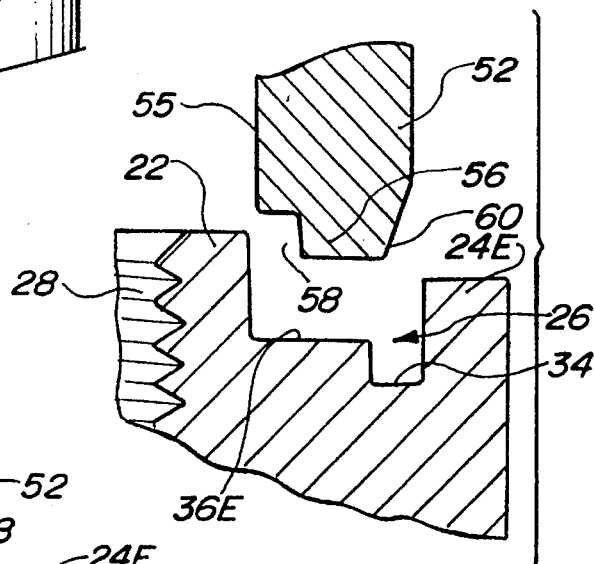
FIG. 9 is a partial cross-sectional view of the nut blank shown in FIGS. 5E and 5F and the forming punch shown in FIGS. 6–8 as the forming punch is received in the nut groove.
Figure 10:
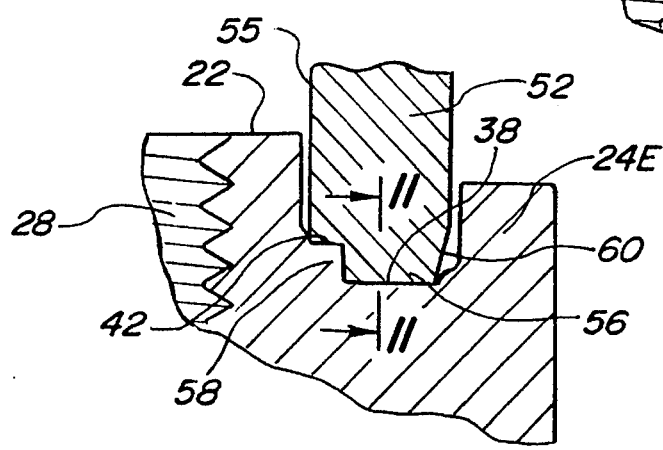
FIG. 10 is a partial cross-sectional side view similar to FIG. 9 after forming of the final configuration of the nut.

The forming punch 50 shown in FIGS. 6 to 8 includes a forming end portion 52 best shown in FIGS. 7 and 8. The forming punch further includes a chuck portion 54 for attachment to a conventional die press. As shown in FIGS. 7 and 8, the forming end 52 of the punch includes a central axial bore 55 and a plurality of circumferentially spaced generally rectangular projections 56. In the preferred embodiment, the generally trapezoidal projections are spaced slightly from the axial bore 54 to form the bridging portions 42 in the nut bottom wall 42, as described hereinbelow. Further, the total area of the projections 56 is preferably less than the total area between the projections, such that the circumferentially spaced protuberances 36 formed between the projections have a greater total area than the channels or pockets 38 formed by the projections. The radial inner and outer surfaces 58 and 60, respectively, of the projections 56 are arcuate and the side faces 62 are generally planar. As best shown in FIGS. 9 and 10, the radial inner and outer surfaces 58 and 60 may be perpendicular to the bottom wall 34 or tapered toward the free end of the punch. The diameter of the axial bore 55 telescopically receives the pilot portion 22 of the nut during forming of the circumferentially spaced protuberances, as now described.

Figure 11:
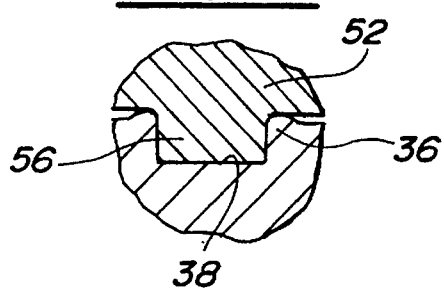
FIG. 11 is a partial cross-sectional view of the punch and nut shown in FIG. 10, in the direction of view-arrows 11—11.

Referring to FIGS. 9 to 11, the forming end 52 of the forming punch is driven into the nut groove 26 against the continuous annular protuberance 36E, deforming the spaced protuberances 36 and forming the radial channels 38, as best shown in FIG. 11. That is, the generally trapezoidal projections 56 of the forming punch deform the protuberance 36, forming radial channels 38 and thereby circumferentially spaced protuberances 36, as shown in FIGS. 1 to 4. This reforming of the continuous protuberance 36E substantially improves tool life without substantially sacrificing the torque resistance of the self-attaching nut 20. As shown in FIG. 10, the punch is driven into the protuberance until the projection 56 is substantially flush with the bottom wall; however, the metal which flows from the protuberance forms a parting line.

Figure 12:
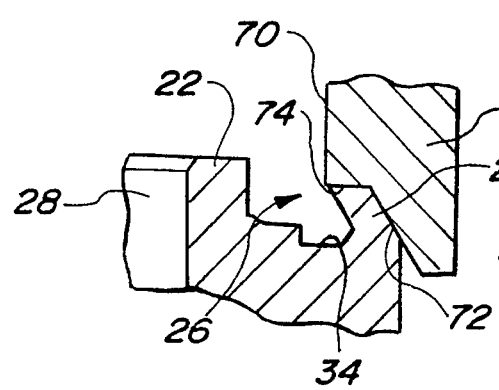
FIG. 12 is a partial cross-sectional view of a forming die and nut during forming of the re-entrant groove of the self-attaching nut.

FIG. 12 illustrates the formation of the inclined flange portion 24, which is preferably formed after formation of the circumferentially spaced protuberances 36. The cold working die member 68 includes an axial bore 70, an inside chamfered surface 72, which is tapered inwardly from the end of the die member toward the axis of the bore 70, and a radial step 74 which reforms the panel supporting free end of the flange portion 24. Thus, the re-entrant groove 26 is formed by driving the chamfered surface 72 of the die member 68 against the outer surface of the flange portion 74, which deforms the free end of the flange portion 24 radially inwardly toward the pilot portion 22 and the radial surface 74 then reforms the free end 32 of the flange portion 24 generally parallel to the free end 30 of the pilot portion 22.

The method of this invention then includes forming a metal nut blank generally as shown in FIG. 5E, including an annular pilot portion 22E, an annular flange portion 24E and an annular groove 26E having a continuous annular protrusion 36E preferably integral with the pilot portion 22E and which extends radially from the pilot portion 22E to a midportion of the groove, spaced from the flange portion 24E. The method then includes driving a forming punch 50 into the annular groove 26 as shown in FIG. 9. The forming punch includes a forming end portion 52 having a plurality of circumferentially spaced projections 56, which are driven against the continuous annular protrusion 36E to form a plurality of circumferentially spaced annular protrusions 36 and radial channels 38 formed by the projections 56, which in the most preferred embodiment are enclosed pockets. In the most preferred embodiment of the method, projections 56 are generally trapezoidal having inclined radial inner and outer surfaces 58 and 60, respectively, and spaced from the bore 5. The radial channels or pockets 38 are thus formed spaced from the pilot portion 22, as shown in FIG. 2, including semi-circular bridging portions 42 integral with the pilot portion and the adjacent circumferentially spaced protuberances 36 as shown in FIG. 2. The method then includes deforming the transverse flange portions 24E (FIGS. 8 and 9) radially inwardly as shown FIG. 12, by driving a cold working die member 68 having a chamfered surface 72 against the flange portions as shown in FIG. 12. This forms a re-entrant groove 26 having a restricted opening to the bottom wall 34, which provides a secure mechanical interlock between the panel (not shown) and the self-attaching nut 20 as described in the above-identified pending applications. Nut bore 28 may be threaded in the blank form as shown in FIGS. 9 and 10, or more preferably, the nut may be threaded in a final step as indicated by FIG. 12. Alternatively, the nut bore may be unthreaded for receipt of a self-tapping or thread rolling screw or bolt.

As will be understood by those skilled in the art, various modifications may be made to the self-attaching nut and method of making a self-attaching nut of this invention. For example, the method of this invention may be utilized to form a self-attaching nut, wherein the protuberances 36 are fully separated by extending the projections 56 radially inwardly to the punch bore 55. The method of this invention may also be utilized to form a self-attaching nut, wherein the protuberances are spaced from the inner wall or pilot portion. Finally, the pilot portion may be deformed radially outwardly by a die member, similar to the die member 68 shown in FIG. 12, to form a re-entrant groove having opposed inclined side walls, although this method may require the use of a self-tapping or thread rolling screw to avoid damage of the threads at the opening to the bore 28. Finally, the depth of the channels or pockets 38 will depend upon the torque-resistance requirements of the nut. In the preferred embodiment, the sides of the channels formed by the side wall 62 of the projections 56 are preferably generally perpendicular to the end face, although the radial inner and outer surfaces 58 and 60 may be arcuate. Having described the preferred embodiments of the method of this invention and the preferred self-attaching nut, we now claim the invention as set forth below.

We claim:

1. A self-attaching nut, said nut including a central annular projecting pilot portion having an axial bore therethrough, an annular flange portion generally surrounding said pilot portion having a generally flat end face extending generally perpendicular to an outer surface of said pilot portion, and an annular groove in said flange portion surrounding said pilot portion, said groove having opposed inner and outer side walls and on bottom wall, said groove outer side wall including a portion inclined inwardly radially toward said pilot portion to define a restricted opening to said groove bottom wall, and said groove bottom wall including a plurality of circumferentially spaced protuberances separated by radially extending circumferentially spaced channels extending from adjacent said groove inner wall to said outer wall.

2. The self-attaching nut defined in claim 1, characterized in that said pilot portion outer surface defines said groove inner wall, and said protuberances are integral with said pilot outer surface, said protuberances extending radially from said pilot portion to a midportion of said groove bottom wall spaced from groove outer wall and said channels generally trapezoidal in shape.

3. The self-attaching nut defined in claim 2, characterized in that said channels are spaced from said pilot portion outer surface and said protrusions include semicircular bridging portions integral with said pilot portion outer surface and adjacent protuberances.

4. The self-attaching nut defined in claim 1, characterized in that said channels each include a generally flat bottom wall generally planar with said groove bottom wall having a radial outer surface and trapezoidal in shape.

5. A self-attaching nut including a central annular projecting pilot portion having an axial bore therethrough, an annular flange portion generally surrounding said pilot portion having a generally flat end face extending generally perpendicular to an outer surface of said pilot portion, an annular groove in said flange portion surrounding said pilot portion, said groove having opposed inner and outer side walls, with said pilot outer surface defining said groove inner wall and at least one of said groove inner and outer side walls inclined toward the opposed side wall to define a restricted opening to said groove bottom wall, and said groove bottom wall including a plurality of circumferentially spaced protuberances separated by radially extending circumferentially spaced channels, that protuberances integral with said pilot portion outer surface and extending radially to a midportion of said groove bottom wall spaced from said groove outer wall.

6. The self-attaching nut defined in claim 5, characterized in that said channels are spaced from said pilot portion outer surface and said protrusions include semicircular bridging portions integral with said pilot and adjacent protuberances.

7. A self-attaching nut comprising:

a central annular projecting pilot portion having an annular end face, a generally cylindrical side face, and an axial bore through said end face, an annular flange portion generally surrounding said pilot portion having an end face extending generally perpendicular to said pilot portion side face spaced from the plane of said pilot portion end face, and an annular groove in said flange portion end face surrounding said pilot portion, said groove having opposed inner and outer side walls and a bottom wall, said groove outer wall including a portion inclined radially inwardly toward said pilot portion to define a restricted opening to said groove bottom wall, said groove bottom wall including a plurality of circumferentially spaced protuberances separated by radially extending circumferentially spaced channels extending from adjacent said groove inner wall toward said groove outer wall, said protuberances extending radially outwardly from said pilot portion toward said groove outer wall and said protuberances each having a radial outer face spaced from said groove outer wall extending generally perpendicular to said groove bottom wall.

8. The self-attaching nut defined in claim 7, characterized in that said pilot portion generally cylindrical side face defines said groove inner wall and said protuberances being integral with said pilot side face, said protuberances extending radially outwardly from said pilot portion to said outer faces of said protuberances defining generally trapezoidal-shaped protuberances.

9. The self-attaching nut defined claim 8, characterized in that the radial inner surfaces of said channels are semicircular.

10. The self-attaching nut defined in claim 9, characterized in that said channels are generally trapezoidal in shape having generally parallel side walls.

11. The self-attaching nut defined in claim 7, characterized in that said groove bottom wall surrounding said protuberances and adjacent said groove outer wall is flat and said channels include a generally flat bottom wall generally parallel with said groove bottom wall having a radial outer surface defined by said groove outer wall and said channels are generally trapezoidal in shape.

12. The self-attaching nut defined in claim 8, characterized in that said channels are spaced from said pilot portion side face and said protuberances include semi-circular bridging portion integral with said pilot portion side face and adjacent protuberances.

13. The self-attaching nut defined in claim 8, characterized in that said channels are generally rectangular in shape having generally parallel side walls defining generally enclosed pockets between said protuberances.

* * * * *